United States Patent
Zhao et al.

(10) Patent No.: US 12,425,632 B2
(45) Date of Patent: Sep. 23, 2025

(54) SYSTEMS AND METHODS FOR COMBINING SUBBLOCK MOTION COMPENSATION AND OVERLAPPED BLOCK MOTION COMPENSATION

(71) Applicant: TENCENT AMERICA LLC, Palo Alto, CA (US)

(72) Inventors: Liang Zhao, Palo Alto, CA (US); Xin Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 112 days.

(21) Appl. No.: 18/142,192

(22) Filed: May 2, 2023

(65) Prior Publication Data
US 2023/0388535 A1  Nov. 30, 2023

Related U.S. Application Data

(60) Provisional application No. 63/346,067, filed on May 26, 2022.

(51) Int. Cl.
*H04N 19/513* (2014.01)
*H04N 19/139* (2014.01)
*H04N 19/176* (2014.01)

(52) U.S. Cl.
CPC ......... *H04N 19/513* (2014.11); *H04N 19/139* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2018/0192071 A1 | 7/2018 | Chuang et al. | |
| 2020/0374540 A1* | 11/2020 | Wang | H04N 19/157 |
| 2021/0051339 A1* | 2/2021 | Liu | H04N 19/105 |
| 2022/0070486 A1 | 3/2022 | Chen et al. | |
| 2022/0201328 A1* | 6/2022 | Galpin | H04N 19/159 |

OTHER PUBLICATIONS

Tencent Technology, ISRWO, PCT/US2023/020897, Jul. 21, 2023, 13 pgs.

* cited by examiner

*Primary Examiner* — Xiaolan Xu
(74) *Attorney, Agent, or Firm* — Morgan, Lewis & Bockius LLP

(57) ABSTRACT

The implementations described herein include methods and systems for coding video. In one aspect, a method includes receiving a current frame including a current coding block. The current coding block has multiple subblocks. The subblocks are associated with different motion vectors, and include a first subblock located at a boundary of the current coding block. The method includes determining a motion vector of the current coding block, determining a first motion vector of the first subblock, and generating motion compensation data of the first subblock based on the motion vector and the first motion vector of the first subblock, e.g., by identifying a prediction block based on the motion vector of the current coding block, identifying a first prediction block based on the first motion vector of the first subblock, and combining the prediction block and the first prediction block to generate the motion compensation data of the first subblock.

12 Claims, 8 Drawing Sheets

SYSTEMS AND METHODS FOR COMBINING SUBBLOCK MOTION COMPENSATION AND OVERLAPPED BLOCK MOTION COMPENSATION

RELATED APPLICATIONS

This application claims priority to U.S. Provisional Patent Application No. 63/346,067, entitled "Combination Between Subblock Motion And Overlapped Block Motion Compensation," filed May 26, 2022, which is hereby incorporated by reference in its entirety.

TECHNICAL FIELD

The disclosed embodiments relate generally to video coding, including but not limited to systems and methods for combining subblock motion compensation and overlapped block motion compensation.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes applying overlapped block motion compensation (OBMC) at a subblock boundary when coding blocks are coded with different motion vectors at a subblock level. Overlapped block motion compensation is applied, e.g., in AV1, at block boundaries for blocks that are coded with translational motion modes based on block-level motion vectors. Additionally, in some embodiments, overlapped block motion compensation is applied when there is a discontinuity on motion information at block and/or subblock boundaries, thereby improving a prediction accuracy level for blocks and subblocks in video coding. Overlapped block motion compensation is applied to refine subblock-based motion compensation including, but not limited to, local and global warp motion, a bidirectional optical flow, and a temporal interpolated prediction mode.

In accordance with some embodiments, a method of video decoding is provided. The method includes receiving a current frame including a current coding block. The current coding block has a plurality of subblocks. The plurality of subblocks are associated with different motion vectors, and include a first subblock located at a boundary of the current coding block. The current coding block has a plurality of subblocks including a first subblock. The method further includes determining a motion vector of the current coding block, determining a first motion vector of the first subblock, and generating motion compensation data of the first subblock based on the motion vector of the current coding block and the first motion vector of the first subblock. In some embodiments, the method further includes identifying one or more adjacent subblocks. The method further includes determining an adjacent motion vector for each respective adjacent subblock. The motion compensation data of the first subblock is generated based on the motion vector of the current coding block, the first motion vector of the first subblock, and one or more adjacent motion vectors of the one or more adjacent subblocks. In some embodiments, each adjacent subblock includes a neighboring subblock that is immediately adjacent to the first subblock.

In some embodiments, generating the motion compensation data of the first subblock further includes identifying a coding prediction block based on the motion vector of the current coding block, identifying a first prediction block based on the first motion vector of the first subblock, and combining the coding prediction block and the first prediction block to generate the motion compensation data of the first subblock. Further, in some embodiments, the method further includes determining a first weight associated with the motion vector of the current coding block and determining a second weight associated with the first motion vector of the first subblock. Combining the coding prediction block and the first prediction block further includes weighted averaging the coding prediction block and the first prediction block based on the first weight and the second weight to generate the motion compensation data of the first subblock.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes applying overlapped block motion compensation at a subblock boundary when coding blocks are coded with different motion vectors at a subblock level. Overlapped block motion compensation is applied, e.g., in AV1, at block boundaries for blocks that are coded with translational motion modes based on block-level motion vectors. In some embodiments of this application, overlapped block motion compensation improves a prediction accuracy level when there is a discontinuity on motion information at block and/or subblock boundaries. Overlapped block motion compensation is applied to refine subblock-based motion compensation including, but not limited to, local and global warp motion, a bidirectional optical flow, and a temporal interpolated prediction mode.

Example Systems and Devices

Figure 1:
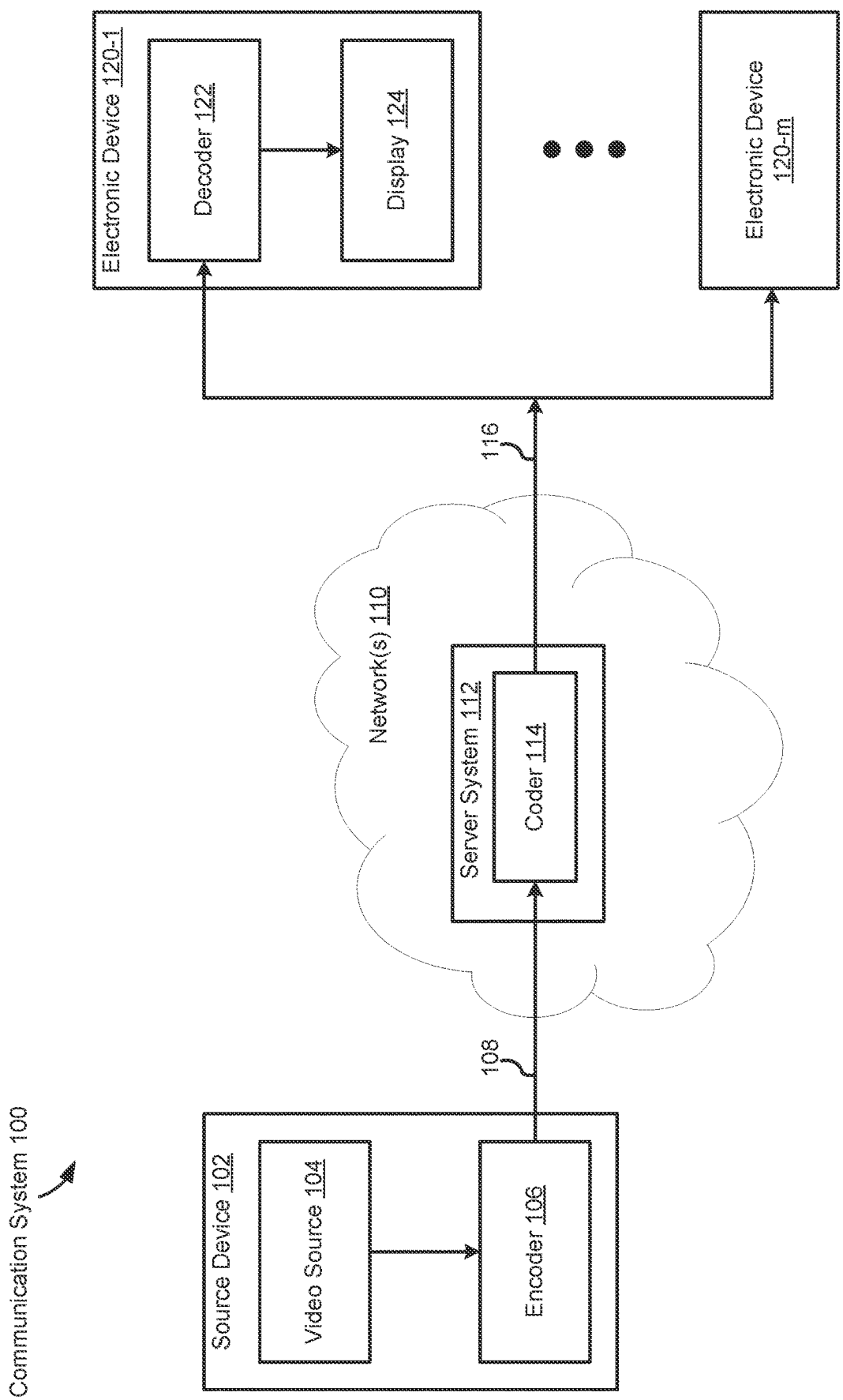
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
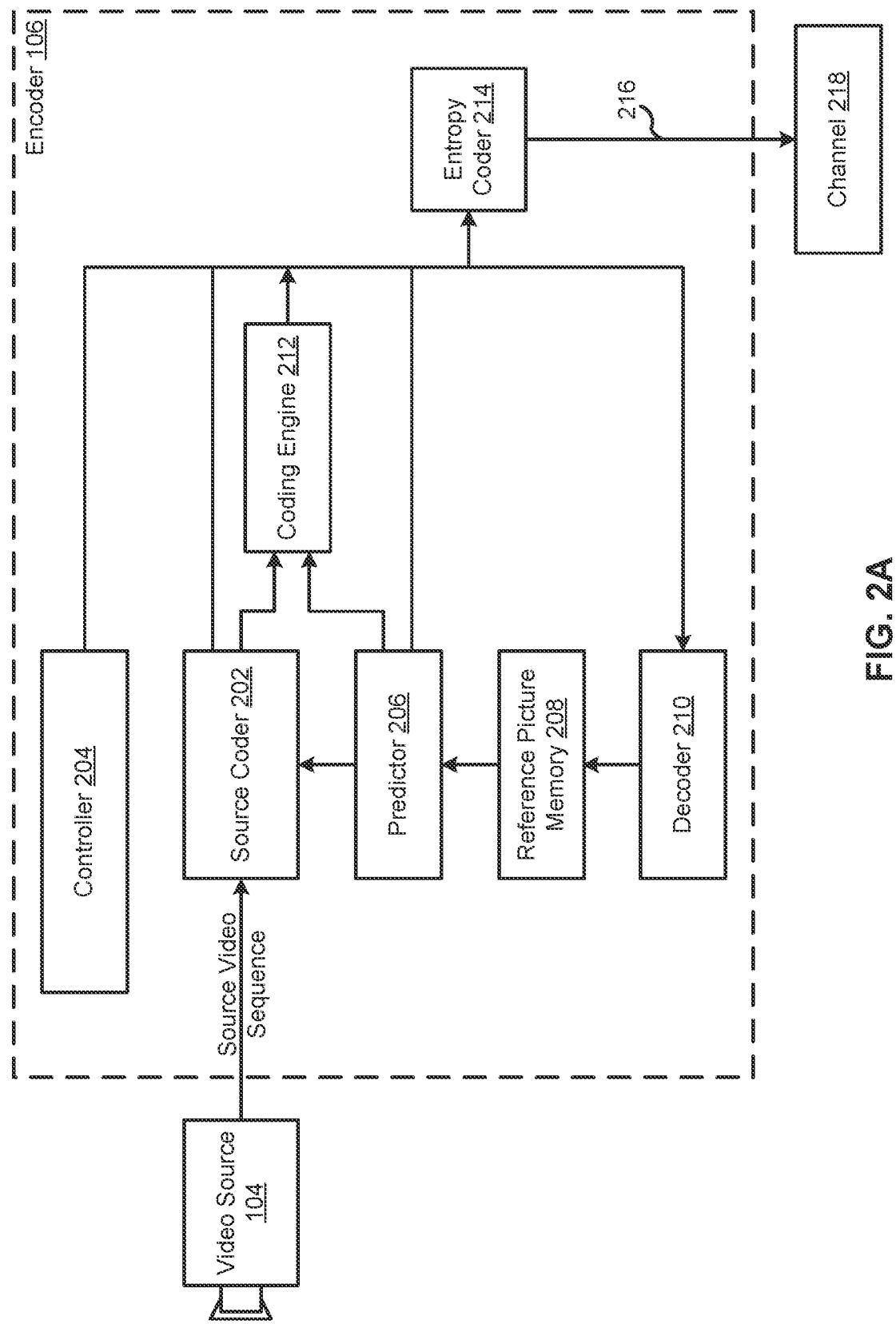
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B.

Figure 2B:
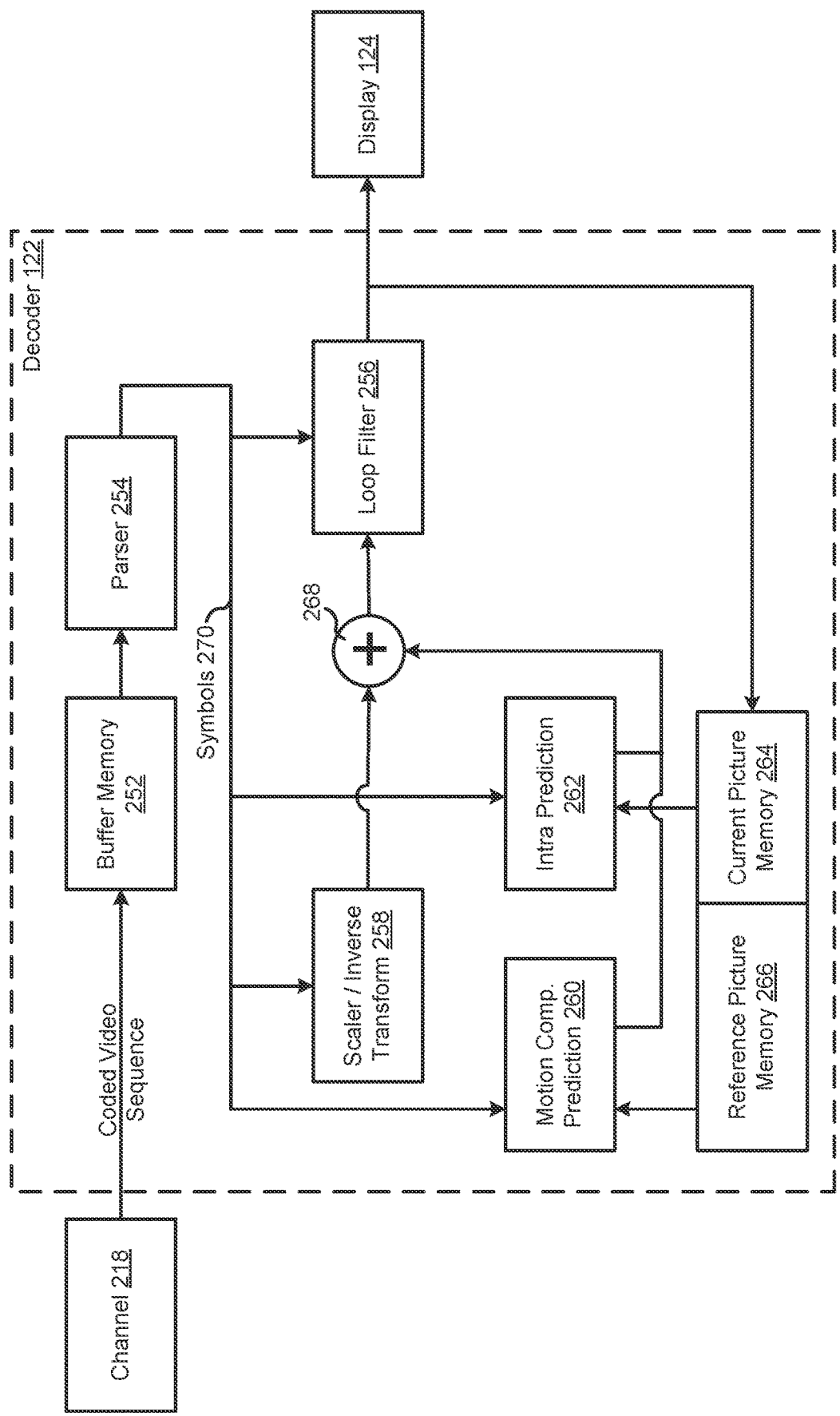
FIG. 2B is a block diagram illustrating example elements of a decoder component in accordance with some embodiments.

Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
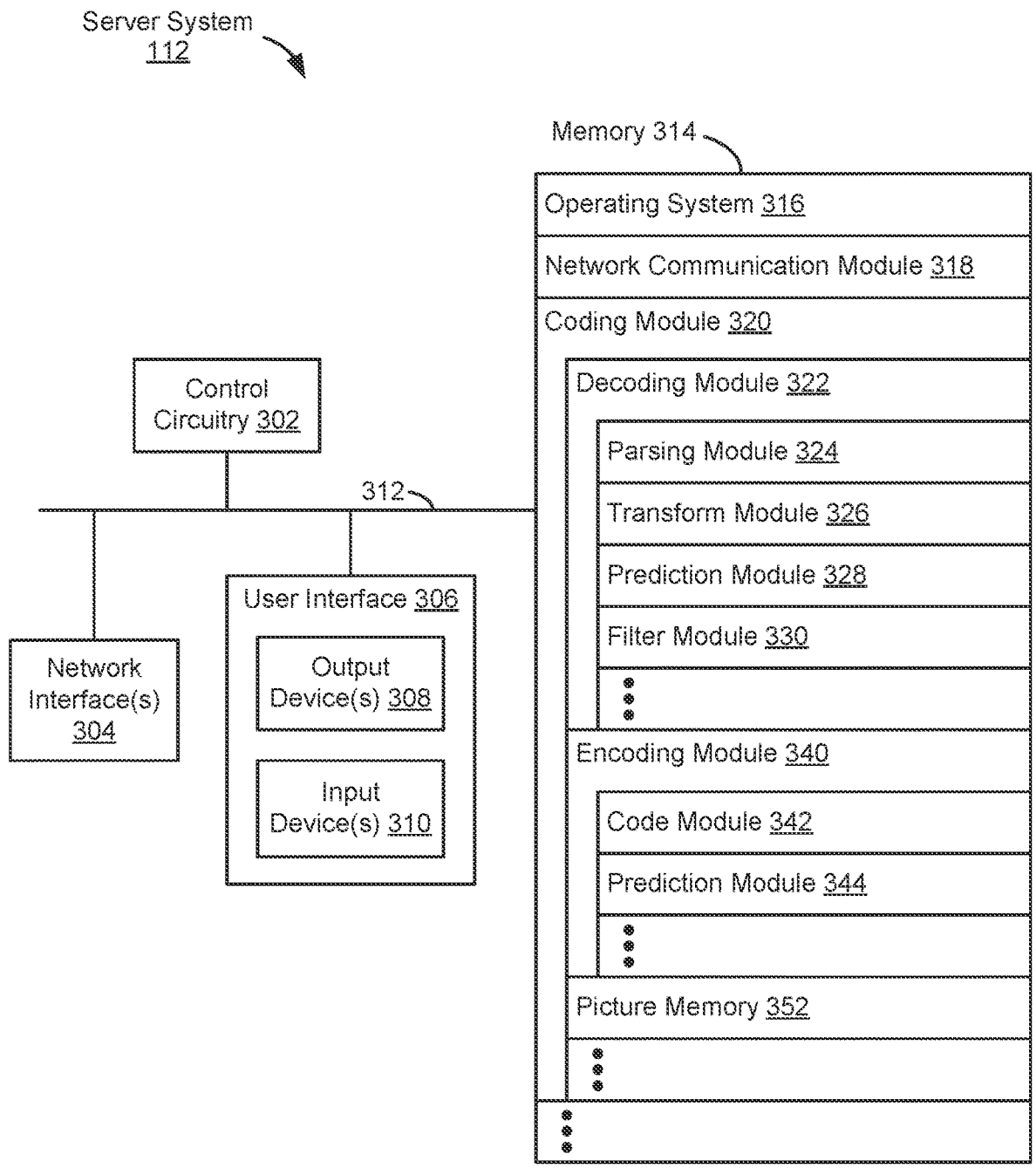
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
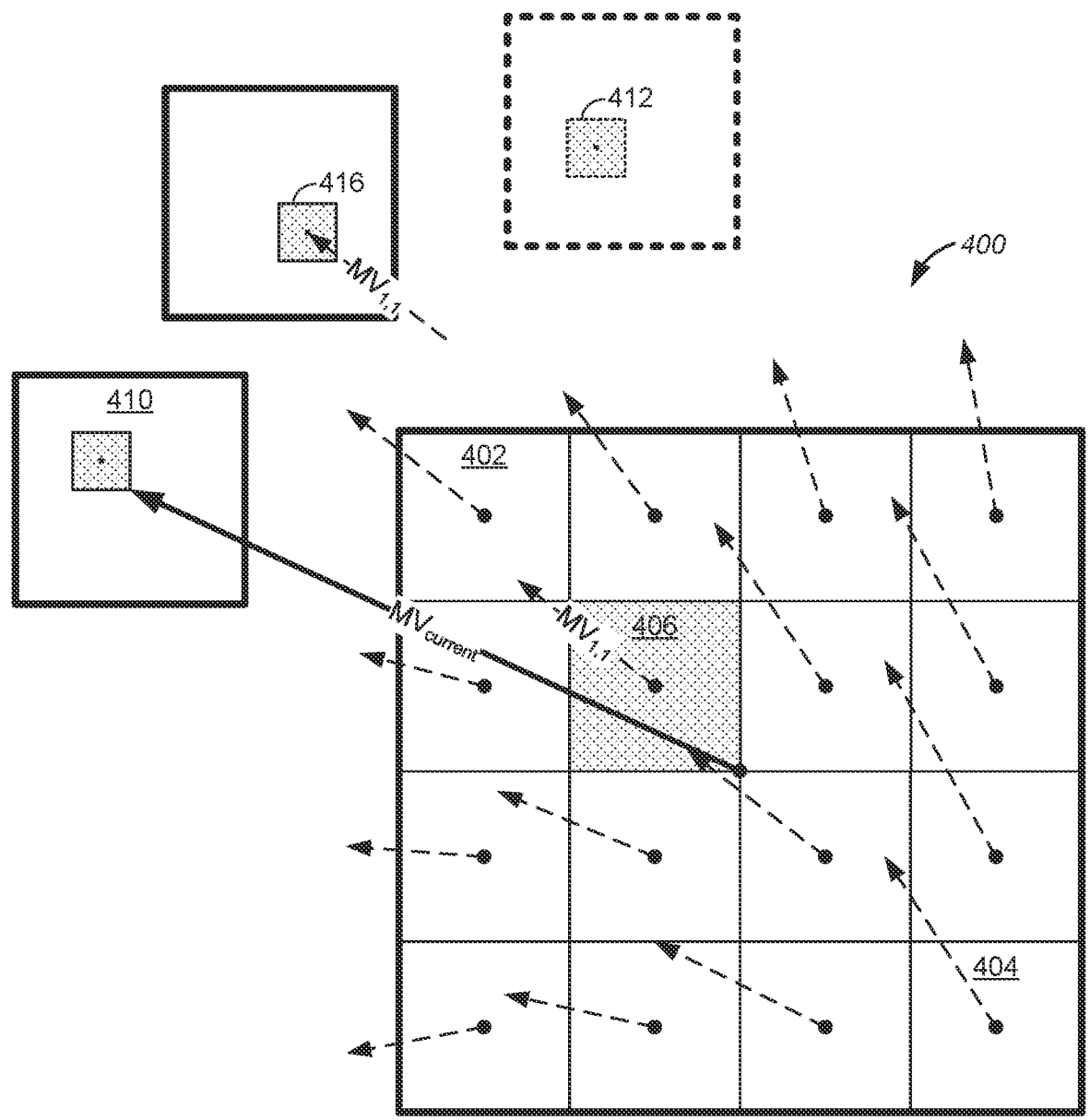
FIG. 4 illustrates a current coding block including a plurality of subblocks, in accordance with some embodiments.

FIG. 4 illustrates a current coding block 400 including a plurality of subblocks, in accordance with some embodiments. A group of pictures (GOP) includes a sequence of image frames. The plurality of image frames includes a current image frame that further includes the current coding block 400. The current coding block 400 is encoded based on prediction data of one or more coding blocks (e.g., 410) of one or more reference images in the GOP. The current coding block 400 is partitioned to a plurality of subblocks (e.g., 4×4 subblocks). A left top subblock 402 is located at a subblock position (0, 0) on the current coding block 400, and a right bottom subblock 404 is located, e.g., at a subblock position (3, 3), on the current coding block 400. The plurality of subblocks includes a first subblock 406 located, e.g., at a subblock (1, 1), on the current coding block 400. The current coding block 400 has a block-level motion vector $MV_{current}$, and the motion vector $MV_{current}$ is configured to identify a reference coding prediction block 410 in a block reference image frame for the current coding block 400. The first subblock 406 has a first motion vector $MV_{1,1}$ at a subblock level, and the first motion vector $MV_{1,1}$ is configured to identify a reference first prediction block 416 in a subblock reference image frame for the first subblock 406. The subblock reference image frame identified by the first motion vector $MV_{1,1}$ of the first subblock 406 is optionally the same as or distinct from the block reference image frame identified by the motion vector $MV_{current}$ of the current coding block 400. Each of the block and subblock reference image frames optionally precedes or follows the current image frame including the current coding block 400 in the GOP.

Motion compensation data of the first subblock 406 is generated based on the motion vector $MV_{current}$ of the current coding block 400 and the first motion vector $MV_{1,1}$ of the first subblock 406. In some embodiments, the coding prediction block 410 is identified. e.g., in the block reference image frame, based on the motion vector $MV_{current}$ of the current coding block 400. The first prediction block 416 is identified, e.g., in the subblock reference image frame, based on the first motion vector $MV_{1,1}$ of the first subblock 406. The coding prediction block 410 and the first prediction block 416 are combined to generate the motion compensation data of the first subblock 406. Further, in some embodiments, a first weight $w_1$ is determined in association with the motion vector $MV_{current}$ of the current coding block 400, and a second weight $w_2$ is determined in association with the first motion vector $MV_{1,1}$ of the first subblock 406. The coding prediction block 410 and the first prediction block 416 are combined in a weighted manner, e.g., by weighted averaging the coding prediction block 410 and the first prediction block 416 based on the first weight $w_1$ and the second weight $w_2$, thereby generating the motion compensation data of the first subblock 406.

Additionally, in some embodiments, the second weight $w_2$ is the same for all samples of different subblocks in the coding prediction block 400, independently a location of the corresponding subblock including the samples. For example, the second weight $w_2$ of samples in the first subblock 406 is determined based on a distance of a center of the current coding block 400 and a center of the first subblock 406. Alternatively, in some embodiments, the second weight $w_2$ depends on a position of each sample in the current coding block 400. For example, the second weight $w_2$ of samples in the first subblock 406 is determined based on a distance of each sample of the current coding block 400 and a center of the first subblock 406. The sum of the first weight $w_1$ and the second weight $w_2$ is equal to a predefined value (e.g., 64). In one example, the second weight $w_2$ is determined to be 16 based on the distance between the centers of the current coding block 400 and the first subblock 406, and the first weight $w_1$ is equal to 48.

In some embodiments, a mode data item is applied to define a NEWMV mode. An encoded video bitstream 108 (FIG. 1) includes the mode data item and is communicated to an electronic device 120. During encoding, the motion vector $MV_{current}$ of the current coding block 400 is encoded into the mode data item. During decoding, the electronic device 120 identifies or extracts the motion vector $MV_{current}$ of the current coding block 400 from the mode data item. Alternatively, in some embodiments, a mode data item is applied to define a NEAR or NEAREST mode. An encoded video bitstream 108 includes the mode data item and is communicated to an electronic device 120. During encoding, the motion vector $MV_{current}$ of the current coding block 400 is used to generate the mode data item. During decoding, the electronic device 120 derives the motion vector $MV_{current}$ of the current coding block 400 from the mode data item.

In some embodiments, a subblock overlapped block motion compensation (OBMC) indicator is associated with the current coding block 400. The encoded video bitstream 108 (FIG. 1) includes the OBMC indicator associated with the current coding block 400. Upon receiving the encoded video bitstream 108, an electronic device 120 determines that the subblock OBMC mode is enabled for the current coding block 400 based on the OBMC indicator. The motion vector $MV_{current}$ of the current coding block 400 and the first motion vector of the first subblock 406 are determined to generate the motion compensation data of the first subblock 406. Further, in some embodiments, in accordance with a determination that the subblock OBMC mode is enabled for the current coding block 400, the motion compensation data of the first subblock 406 is generated based on the motion vector $MV_{current}$, the first motion vector, and one or more adjacent motion vectors of one or more adjacent subblocks of the first subblock 406. More details on OBMC involving adjacent subblocks are explained below with reference to FIGS. 5-7.

In some embodiments, the first motion vector $MV_{1,1}$ of the first subblock 406 includes a forward coding motion vector corresponding to a forward prediction block 416 and backward coding motion vector corresponding to a backward prediction block 412. The method 700 further includes determining a subblock OBMC parameter indicating whether each of the forward backward prediction block 412 and the backward prediction block 416 is applied to predict the plurality of subblocks of the current coding block 400 including the first subblock 406. In accordance with a determination that the subblock OBMC parameter satisfies a predefined criterion (e.g., indicating that the blocks 412 and 416 are applied to predict the first subblock 406), a first prediction block of the first subblock is determined based on an average of the forward prediction block 416 and the backward prediction block 412. Further, in some embodiments, the first subblock 406 is interpolated from the forward prediction block 412 and the backward prediction block 416. The forward coding motion vector and the backward coding motion vector are based on distances of the first subblock 406 to the forward prediction block 412 and the backward prediction block 416, respectively.

Figure 5:
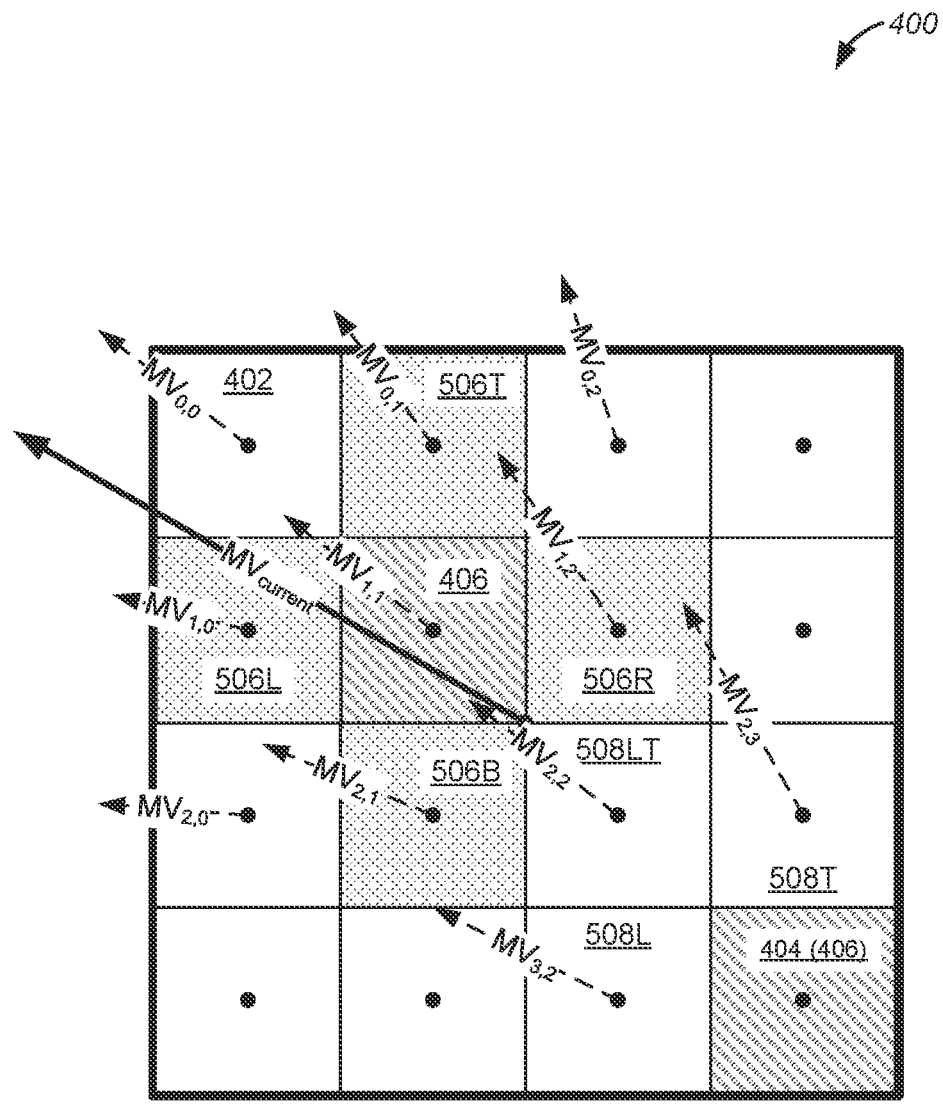
FIG. 5 illustrates a current coding block including a first subblock surrounded by a plurality of adjacent subblocks in the current coding block, in accordance with some embodiments.

FIG. 5 illustrates a current coding block 400 including a first subblock 406 surrounded by a plurality of adjacent subblocks 506 in the current coding block 400, in accordance with some embodiments. The current coding block 400 is partitioned to a plurality of subblocks (e.g., 4×4 subblocks). A left top subblock 402 is located at a subblock position (0, 0) on the current coding block 400, and a right bottom subblock 404 is located, e.g., at a subblock position (3, 3), on the current coding block 400. The plurality of subblocks includes the first subblock 406, and the first subblock 406 is located, e.g., at a subblock (1, 1) of the current coding block 400. The current coding block 400 has a block-level motion vector $MV_{current}$, and the first subblock 406 has a first motion vector $MV_{1,1}$ at a subblock level. The first subblock 406 has one or more adjacent (e.g., immediately adjacent, neighboring) subblocks 506. Referring to FIG. 5, the one or more adjacent subblocks 506 are entirely located in the same current coding block 400 as the first subblock 406. The motion compensation data of the first subblock 406 is generated based on the motion vector $MV_{current}$ of the current coding block 400, the first motion vector $MV_{1,1}$ of the first subblock 406, and one or more adjacent motion vectors of the one or more adjacent subblocks 502.

In some embodiments, the one or more adjacent subblocks 506 include one or more of: a top adjacent subblock 506T, a bottom adjacent subblock 506B, a left adjacent subblock 506L, and a right adjacent subblock 506R. Each adjacent subblock 506 has an adjacent motion vector configured to identify a reference subblock in a respective reference image frame for the respective adjacent subblock 506. The adjacent subblock 506T, 506B, 506L, or 506R has a subblock position (0, 1), (2, 1), (1, 0), or (1, 2) and corresponds to a motion vector $MV_{0,1}$, $MV_{2,1}$, $MV_{1,0}$, or $MV_{2,2}$, respectively. In some embodiments, the motion compensation data of the first subblock 406 is generated based on the motion vector $MV_{current}$ of the current coding block 400, the first motion vector $MV_{1,1}$ of the first subblock 406, and a subset or all of the adjacent motion vectors $MV_{0,1}$, $MV_{2,1}$, $MV_{1,0}$, and $MV_{1,2}$. In an example, only one of the adjacent motion vectors (e.g., $MV_{0,1}$) is used with the motion vectors $MV_{current}$ and $MV_{1,1}$ to generate the motion compensation data of the first subblock 406. In another example, all of the adjacent motion vectors $MV_{0,1}$, $MV_{2,1}$, $MV_{1,0}$, and $MV_{1,2}$ are used with the motion vectors $MV_{current}$ and $MV_{1,1}$ to generate the motion compensation data of the first subblock 406. In yet another example, two adjacent motion vectors $MV_{0,1}$ and $MV_{1,0}$ are used to generate the motion compensation data of the first subblock 406.

Prediction blocks of the current coding block 400, the first subblock 406, and one or more adjacent subblocks 506 are identified based on the motion vector $MV_{current}$, the first motion vector $MV_{1,1}$, and a subset or all of the adjacent motion vectors $MV_{0,1}$, $MV_{2,1}$, $MV_{1,0}$, and $MV_{1,2}$, respectively, and combined to generate the motion compensation data of the first subblock 406. In some embodiments, these prediction blocks are combined in a weighted manner, e.g., using the distances between the boundary of the adjacent sub-blocks to each position of the sample in the first sub-block, and a subset or all of the adjacent motion vectors $MV_{0,1}$, $MV_{2,1}$, $MV_{1,0}$, and $MV_{1,2}$. Stated another way, each of the adjacent motion vectors of the adjacent subblocks 506 has an third weight $w_3$ determined based on the distance between the boundary of the adjacent sub-blocks to each position of sample in the first sub-block. In some embodiments, the third weights for adjacent sub-blocks are pre-defined and fixed. Equal weighting factors are used among all the adjacent sub-blocks of the current coding block 400. A coding prediction block, a first prediction block, and one or more adjacent prediction blocks are averaged in an weighted manner based on a first weight $w_1$, a second weight $w_2$, and the third weight $w_3$ of each respective adjacent subblock 506 to generate the motion compensation data of the first subblock 406.

Further, in some embodiments, the one or more adjacent subblocks 506 of the first subblock 406 include one or more of: the left top adjacent subblock 402, a right top adjacent block 502RT, a right bottom adjacent block 502RB, and a left bottom adjacent block 502LB in addition to one or more of the adjacent subblocks 502T, 506B, 506L, and 506R. The adjacent subblock 402, 506RT, 506RB, or 506LB has a subblock position (0, 0), (0, 2), (2, 2), or (2, 0) and a motion vector $MV_{0,0}$, $MV_{0,2}$, $MV_{2,2}$, or $MV_{2,0}$, respectively. The motion compensation data of the first subblock 406 is generated based on the motion vector $MV_{current}$ of the current coding block 400, the first motion vector $MV_{1,1}$ of the first subblock 406, and a subset or all of the adjacent motion vectors $MV_{0,1}$, $MV_{2,1}$, $MV_{1,0}$, $MV_{1,2}$, $MV_{0,0}$, $MV_{0,2}$, $MV_{2,2}$, and $MV_{2,0}$. In some embodiments, each of the subblocks 502T, 506B. 506L, and 506R share a side with the first subblock 406 and is called a neighboring subblock. In some embodiments, each of the subblocks 402, 506RT, 506RB, 506LB, 506L, 502T, 506B, 506L, and 506R share a corner node or a side with the first subblock 406 and is called a neighboring subblock. In some embodiments, the one or more adjacent subblocks 506 of the first subblock 406 broadly include one or more of subblocks that are immediately adjacent to the neighboring subblocks 506.

In some embodiments, the first subblock 406 includes the right bottom subblock 404. The one or more adjacent subblocks of the subblock 404 include a top adjacent sub-block 508T, a left adjacent subblock 508L, and a left top adjacent subblock 508LT. Each adjacent subblock 508T, 508L, or 508LT has an adjacent motion vector $MV_{2,3}$, $MV_{3,2}$, or $MV_{2,2}$ configured to identify a reference subblock in an adjacent reference image frame in a GOP for the respective adjacent subblock 508. The motion compensation data of the subblock 404 is generated based on the motion vector $MV_{current}$ of the current coding block 400, the first motion vector $MV_{1,1}$ of the subblock 404, and a subset or all of adjacent motion vectors of the adjacent subblocks 508T, 508L, and 508LT.

In some embodiments not shown, the first subblock 406 includes a subblock located at a subblock position (1, 3), (2, 3), (3, 1), (3, 2), (1, 2), (2, 1), or (2,2). Motion compensation data of the first subblock 406 is determined based on motion vectors of one or more adjacent subblocks of the first subblock 406, and the one or more adjacent subblocks are located within the current coding block 400.

Figure 6:
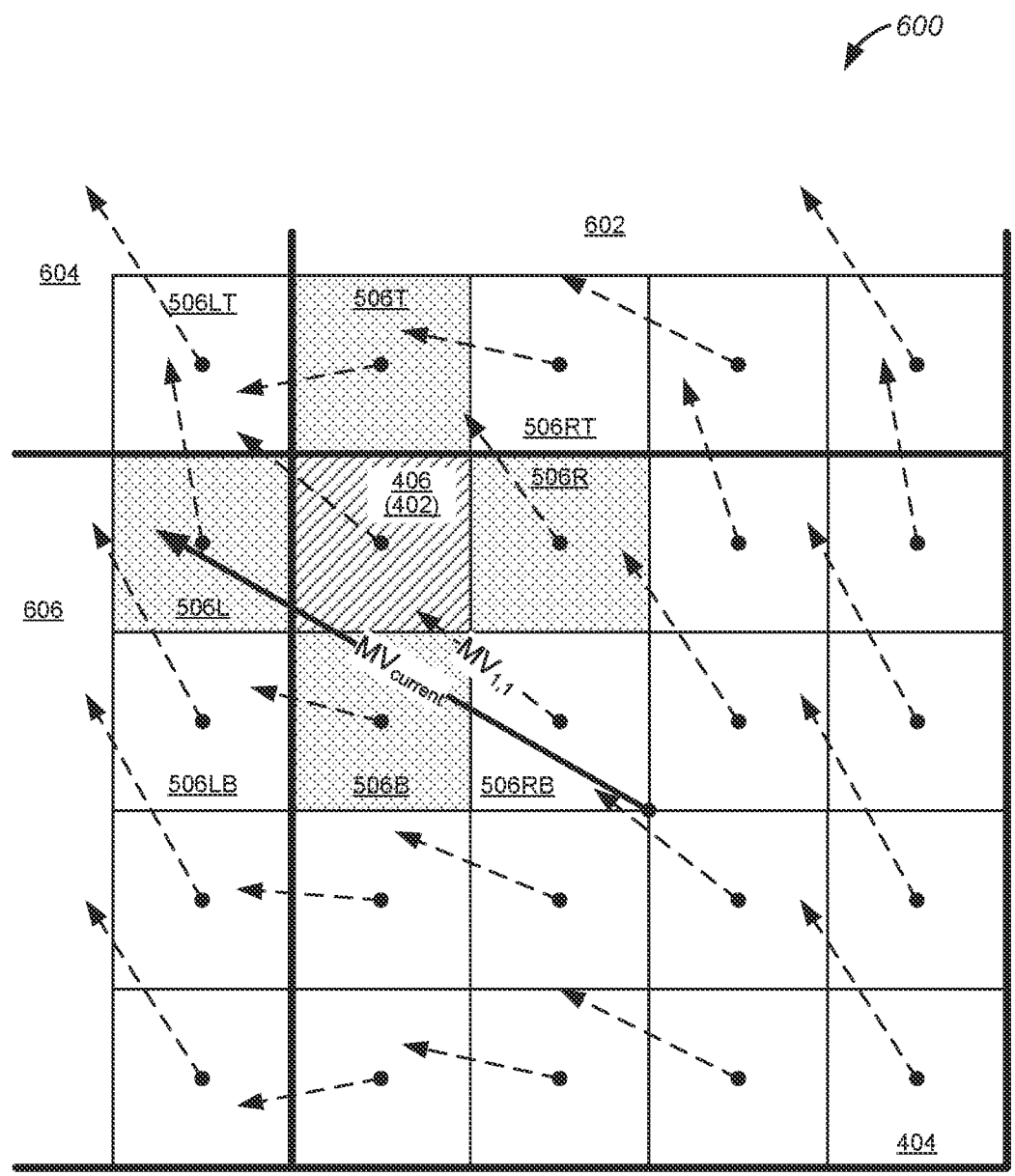
FIG. 6 illustrates a portion of a current image frame including a current coding block and neighboring coding blocks, in accordance with some embodiments.

FIG. 6 illustrates a portion of a current image frame 600 including a current coding block 400 and neighboring coding blocks 602, 604, and 606, in accordance with some embodiments. The current image frame 600 includes a first subblock 406 adjacent to a subset of adjacent subblocks 506 that are external to the current coding block 400. The current coding block 400 is partitioned to a plurality of subblocks (e.g., 4×4 subblocks). A left top subblock 402 is located at a subblock position (0, 0) on the current coding block 400, and a right bottom subblock 404 is located, e.g., at a subblock position (3, 3), on the current coding block 400. The plurality of subblocks includes a first subblock 406 located at a boundary of the current image frame 600, i.e., at least one side of the first subblock 406 overlaps one of the boundaries of the current image frame 600. In this example, the first subblock 406 is located at a subblock position (0, 0), and includes the left top subblock 402 of the current coding block 400 is located. The current coding block 400 has a block-level motion vector $MV_{current}$, and the first subblock 406 has a first motion vector $MV_{0,0}$ at a subblock level. The first subblock 406 has one or more adjacent (e.g., immediately adjacent, neighboring) subblocks 506. The motion compensation data of the first subblock 406 is generated based on the motion vector $MV_{current}$ of the current coding block 400, the first motion vector $MV_{0,0}$ of the first subblock 406, and one or more adjacent motion vectors of the one or more adjacent subblocks 506.

In some embodiments, the one or more adjacent sub-blocks 506 (e.g., 506R, 506B, 506RB, or a combination thereof) of the first subblock 406 are entirely located in the same current coding block 400 as the first subblock 406. The motion compensation data of the first subblock 406 is generated based on the motion vector $MV_{current}$, the first motion vector $MV_{0,0}$ of the first subblock 406, and one or more adjacent motion vectors (e.g., $MV_{1,1}$, $MV_{0,1}$, $MV_{1,0}$) of the one or more adjacent subblocks 506 in the current coding block 400.

Referring to FIG. 6, in some embodiments, the one or more adjacent subblocks 506 (e.g., 506T, 506L, 506RT, 506LT, 506LB, or a combination thereof) of the first sub-block 406 are external to the current coding block 400 where the first subblock 406 is located. For example, the one or more adjacent subblocks 506 include one or both of subblocks 506T and 506RT, and are included in a top coding block 602 that is located immediately on top of the current coding block 400. In another example, the one or more adjacent subblocks 506 include a subblock 506LT, and are at least partially included in a left top coding block 604 that is immediately connected to a left top corner of the current coding block 400. In yet another example, the one or more adjacent subblocks 506 includes one or both of subblocks 506L and 506LB, and are at least partially included in a left coding block 606 that is located immediately on the left of the current coding block 400.

In some embodiments, the motion compensation data of the first subblock 406 is generated based on one or more adjacent motion vectors (e.g., $MV_{-1,-1}$, $MV_{0,-1}$, $MV_{-1,0}$, $MV_{1,-1}$, $MV_{-1,1}$) of the one or more adjacent subblocks 506 external to the current coding block 400. In an example, the motion compensation data of the first subblock 406 is generated based on the motion vector $MV_{current}$, the first motion vector $MV_{0,0}$, and the adjacent motion vectors $MV_{-1,0}$ and $MV_{0,-1}$ of the adjacent subblocks 506T and 506L. Alternatively, in some embodiments, for each adjacent subblock 506 external to the current coding block 400, an adjacent motion vector of a corresponding neighboring coding block is used as a motion vector of the respective adjacent subblock 506 to determine the motion compensation data of the first subblock 406. For example, the motion compensation data of the first subblock 406 is generated based on the motion vector $MV_{current}$, the first motion vector $MV_{0,0}$, and the adjacent motion vectors of the neighboring coding blocks 602 and 606.

Additionally, in some embodiments, the first subblock 406 corresponds to a subset of first adjacent subblocks located in a neighboring coding block 602, 604, or 606 (i.e., external to the current coding block 400) and a subset of second adjacent subblocks located in the current coding block 400. For example, the subset of first adjacent subblocks includes one or both of a subblock 506T located in the top coding block 602 and another subblock 506L located in the left coding block 606, and the subset of second adjacent subblocks includes one or both of the subblocks 506R and 506B.

It is noted that in some embodiments not shown, the first subblock 406 is located at a top boundary (e.g., at a subblock position (0, 1)), and the one or more adjacent subblocks 506 includes a subset or all of three subblocks (e.g., located at positions (−1, 0), (−1, 1) and (−1, 2)) on a last row of the top coding block 602 that is located immediately on top of the current coding block 400. The motion compensation data of the first subblock 406 is generated based on the motion vector of the top coding block 602 or motion vector(s) of the adjacent subblocks of the last row of the top coding block 602. In some embodiments not shown, the first subblock 406 located at a left boundary (e.g., at a subblock position (2, 0)), and the one or more adjacent subblocks 506 includes a subset or all of three subblocks (e.g., located at positions (1, −1), (2, −1) and (3, −1)) of a rightmost column of the left coding block 606 that is located immediately to the left of the current coding block 400. The motion compensation data of the first subblock 406 is generated based on the motion vector of the left coding block 606 or motion vector(s) of the adjacent subblocks of the rightmost column of the left coding block 606.

The first subblock 406 corresponds to eight immediately adjacent subblocks 506 that are connected to the first subblock 40 by at least a corner, and another sixteen adjacent subblocks that are separated from the first subblock 406 only by the eight immediately adjacent subblocks 506. In some embodiments, a subset or all of the eight immediately adjacent subblocks 506 are applied to determine motion compensation data of the first subblock 406. In some embodiments, a subset or all of the sixteen adjacent subblocks are also applied to determine motion compensation data of the first subblock 406. In some embodiments, one or more adjacent subblock identifiers are defined for the first subblock 406 on a subblock level, and used to select one or more motion vectors of the one or more adjacent subblocks 506 of the first subblock 406 and determine the motion compensation data of the first subblock 406. Alternatively, in some embodiments, one or more adjacent subblock identifiers are defined on a frame level, and applied to all subblocks of the current image frame 600 including the first subblock 406 of the current coding block 400. Alternatively, in some embodiments, one or more adjacent subblock identifiers are defined on a coding block level, and applied to the plurality of subblocks of the current coding block 400 including the first subblock 406.

Additionally, in some embodiments, an adjacent subblock selection rule is applied. In accordance with the adjacent subblock selection rule, the one or more adjacent subblocks 506 are selected for the first subblock 406 based on a position of the first subblock 406 in the current coding block 400, a position of the current coding block 400 in the current image frame 600, or both. For example, referring to FIG. 5, if the first subblock 406 is located at a subblock position (1, 1), the adjacent blocks 506T, 506L, 506B, and 506R are applied to determine the motion compensation data of the first subblock 406. If the first subblock 406 is located at a subblock position (3, 3), the adjacent blocks 508T, 508L, and 508LT are applied to determine the motion compensation data of the first subblock 406.

Figure 7:
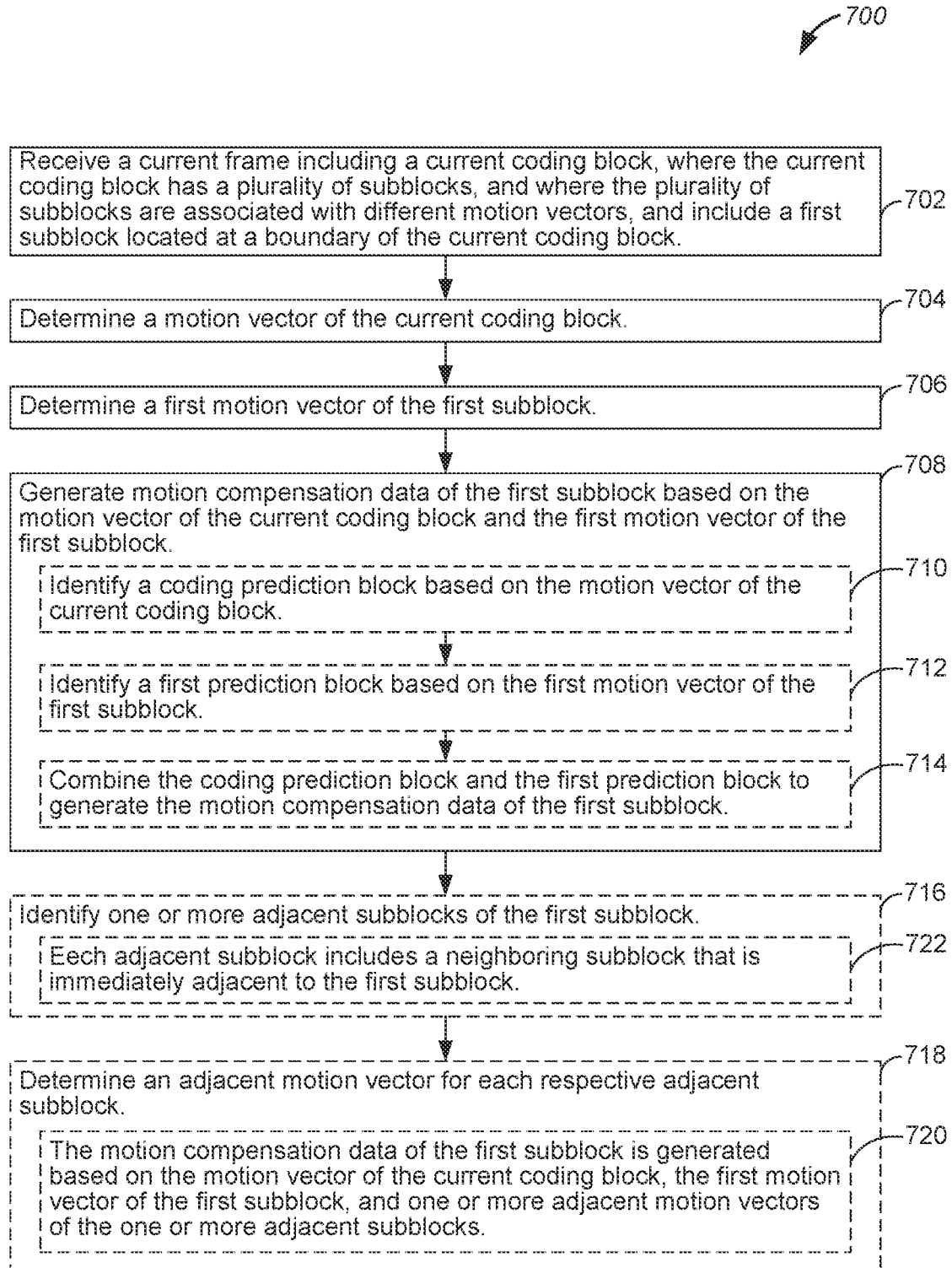
FIG. 7 is a flow diagram of an example method for processing video data, in accordance with some embodiments.

FIG. 7 is a flow diagram of an example method 700 for processing (e.g., decoding) video data, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is performed by executing instructions stored in the memory (e.g., coding module 320 of the memory 314) of the computing system. The computer system receives (702) a current image frame including a current coding block 400. The current coding block 400 has a plurality of subblocks. The plurality of subblocks are associated with different motion vectors, and include a first subblock 406 located at a boundary of the current coding block. The computer system determines (704) a motion vector $MV_{current}$ of the current coding block 400, determines (706) a first motion vector of the first subblock 406, and generates (708) motion compensation data of the first subblock 406 based on the motion vector of the current coding block 400 and the first motion vector of the first subblock 406.

In some embodiments, a warped motion mode is applied as one of a plurality of coding modes to generate a subblock motion vector within a current coding block 400. The current coding block 400 is divided into a plurality of subblocks. Each subblock is associated with a respective motion vector for motion compensation. Every two subblocks of the current coding block 400 optionally have the same motion vectors or different motion vectors. Overlapped block motion compensation is applied at subblock boundaries of the current coding block 400. Further, in some embodiments, the current coding block 400 is associated with a motion vector, and includes a first subblock 406 having a first motion vector. In an example, the current coding block 400 is split into 16 subblocks (e.g., in FIG. 4), and is associated with a motion vector Me=nt. In some embodiments, the motion vector $MV_{current}$ of the current coding block 400 is signaled using a NEWMV mode. Alternatively, in some embodiments, the motion vector $MV_{current}$ of the current coding block 400 is derived using a NEAR or NEAREST mode, and for each subblock of the current coding block 400, an individual motion vector is derived using the warped motion mode. For example, a subblock motion vector $MV_{1,1}$ is associated with a first subblock 406 located at a subblock position (1, 1) of the current coding block 400. The current coding block 400 is coded by a local warped motion mode, and for the first subblock 406 located at the subblock position (1, 1), overlapped block motion compensation is applied to generate the motion compensation data of the first subblock 406 based on the motion vector $MV_{current}$ of the current coding block 400 and the first motion vector $MV_{1,1}$ of the first subblock 406. In an example, the motion compensation data of the first subblock 406 located at the subblock position (1, 1) is generated by combining (714) a coding prediction block 410 identified (710) by the motion vector $MV_{current}$ of the current coding block 400 and a first prediction block 416 identified (712) by the first motion vector $MV_{1,1}$, e.g., using a weighted average of the coding prediction block 410 and the first prediction block 416.

In some embodiments, independently of the subblock position of the first subblock 406 in the current coding block 400, motion vectors used in overlapped block motion compensation include one or more of: a motion vector $MV_{current}$ associated with the current coding block 400, one or more adjacent motion vectors of one or more adjacent subblocks 506 (FIG. 5) of the first subblock 406, and a motion vector of a neighboring coding block 602, 604, or 606. In an example, the current coding block 400 is split into 16 subblocks, and is associated with a motion vector $MV_{current}$. In some embodiments, the motion vector $MV_{current}$ of the current coding block 400 is signaled using a NEWMV mode. Alternatively, in some embodiments, the motion vector $MV_{current}$ of the current coding block 400 is derived using a NEAR or NEAREST mode, and for each subblock of the current coding block 400, an individual motion vector is derived using a local warped motion mode. For each subblock of the current coding block 400, a respective motion vector is derived using the local warped motion mode. For example, a first motion vector $MV_{1,1}$ is associated with a first subblock 406 located at a subblock position (1, 1) of the current coding block 400.

In some embodiments, the first subblock 406 located at a subblock position (1, 1) has (716) four adjacent subblocks located at subblock positions (1, 0), (0, 1), (1, 2), and (2,1) having (718) four motion vectors $MV_{1,0}$, $MV_{0,1}$, $MV_{1,2}$ and $MV_{2,1}$, respectively. When the current coding block 400 is coded by the local warped motion mode and overlapped block motion compensation is applied on the current coding block 400, motion compensation data of the first subblock 406 located at the subblock position (1, 1) of the current coding block 400 is generated (720) using the first motion vector $MV_{1,1}$ of the first subblock 406 and a subset or all of the adjacent motion vectors $MV_{1,0}$, $MV_{0,1}$, $MV_{1,2}$, and $MV_{2,1}$ of the adjacent subblocks. In some embodiments, each adjacent subblock 506 includes (722) a neighboring subblock that is immediately adjacent to the first subblock 406.

Additionally, each current sample within the first subblock 406 corresponds to prediction samples associated with the adjacent motion vectors $MV_{1,0}$, $MV_{0,1}$, $MV_{1,2}$ and $MV_{2,1}$ and having different weights. A prediction sample of a current sample associated with a motion vector MV refers to a sample in a reference picture by adding the motion MV to a position of the current sample. The corresponding predication samples associated with the adjacent motion vectors $MV_{1,0}$, $MV_{0,1}$, $MV_{1,2}$ and $MV_{2,1}$, are combined based on the different weights to generate each current sample in the first subblock 406. For a current sample of the first subblock 406, a weight for each respective prediction sample identified by an adjacent motion vector $MV_{1,0}$, $MV_{0,1}$, $MV_{1,2}$, or $MV_{2,1}$ is determined based on a relative distance from the current sample of the first subblock 406 to the respective adjacent subblock 506L, 506T, 506R, or 506B.

In some embodiments, the motion compensation data of the first subblock 406 (e.g., located at the subblock position (1, 1)) of the current coding block 400 is generated using one or more of: the motion vector of the current coding block 400, the first motion vector of the first subblock 406, and all or a subset of the adjacent motion vectors $MV_{1,0}$, $MV_{0,1}$, $MV_{1,2}$ and $MV_{2,1}$ of the adjacent subblocks. In some embodiments, an indicator is applied to indicate whether the motion vector of the current coding block 400 or the adjacent motion vectors of the adjacent subblocks are used. The indicator is explicitly encoded for the current coding block 400 in a data stream, and decoded by a video decoder 122 to determine whether motion vectors of the first and adjacent subblocks are used to generate motion compensation data at a subblock level. Alternatively, in some embodiments, no indicator is explicitly encoded in a data stream for the current coding block 400 to indicate whether the motion vector of the current coding block 400 MV or the adjacent motion vectors of the adjacent subblocks are used. A data stream received at the video decoder implicitly includes such information, and therefore, is analyzed to determine whether motion vectors of the first and adjacent subblocks are used to generate motion compensation data at a subblock level.

In some embodiments, a first subblock 406 is located immediately adjacent to a boundary of the current coding block 400 (e.g., at a subblock position (0, 1)), and motion compensation data of the first subblock 406 is generated using the motion vector $MV_{current}$ of the current coding block 400), motion vectors of neighboring coding blocks, and/or a subset of the adjacent motion vectors of the adjacent subblocks. In some embodiments, an indicator is applied to indicate whether motion vectors of the current coding block 400, or the neighboring coding block, or the adjacent subblocks are used. The indicator is explicitly encoded for the current coding block 400 in a data stream, and decoded by a video decoder 122 to determine what motion vectors are used to generate motion compensation data at a subblock level. Alternatively, in some embodiments, no indicator is explicitly encoded in a data stream for the current coding block 400. The data stream is sent to the video decoder 122 and analyzed to determine what motion vectors are used to generate motion compensation data at a subblock level.

In some embodiments, based on a position of the first subblock 406 in the current coding block 400, a motion vector of an adjacent subblock in an adjacent coding block is applied to determine motion compensation data of the first subblock 406 of the current coding block 400. For example, in accordance with a determination that first subblock 406 is located at a boundary (e.g., a top boundary or a left boundary) of the current coding block 400, a motion vector of an adjacent coding block, a motion vector of an adjacent subblock of the adjacent coding block, or both are used to determine motion compensation data of the first subblock 406 of the current coding block 400. Conversely, in accordance with a determination that first subblock 406 is not located at a boundary of the current coding block 400, motion vectors of adjacent subblocks located in the same current coding block 400 are used to determine motion compensation data of the first subblock 406 of the current coding block 400. In some embodiments, in accordance with a determination that first subblock 406 is located at a bottom or right boundary of the current coding block 400, no motion vector of adjacent coding block is used, while one or more motion vectors of one or more adjacent subblocks located in the same current coding block 400 are used to determine motion compensation data of the first subblock 406 of the current coding block 400.

In some embodiments, in a bi-directional optical flow (OPFL) (e.g., CWG-B041), overlapped block motion compensation is applied at subblock boundaries. A subblock refers to a block on which an individual motion vector is assigned with using OPFL. In one example, the subblock size is 4×4 or 8×8 pixels, overlapped block motion compensation is applied on top of OPFL coded block for deriving a prediction block associated with one or both reference frames. In some embodiments, a Temporal Interpolated Prediction (TIP) mode is applied (e.g., in CWG-C007). Overlapped block motion compensation is applied at subblock boundaries. A subblock refers to a block on which a motion field is generated. In an example, a subblock size is 8×8 pixels. Overlapped block motion compensation is applied on top of a TIP coded block for deriving a prediction block associated with one or both reference frames.

Specifically, in some embodiments, motion compensation data of subblocks of a coding block (e.g., 410 and 416 in FIG. 4) in the reference frames is determined based on a combination of the motion vector of the coding block and the first motion vector of the corresponding subblock. Further, in some embodiments, the motion compensation data of the subblocks of the coding block (e.g., 410 and 416 in FIG. 4) in the reference frames is determined based on one or more motion vectors of one or more adjacent subblocks in the same coding block. Alternatively, in some embodiments, the motion compensation data of the subblocks of the coding block (e.g., 410 and 416 in FIG. 4) in the reference frames is determined based on one or more motion vectors of one or more adjacent subblocks in one or more adjacent coding blocks of the coding block (e.g., 410 and 416 in FIG. 4) in the reference frames, e.g., based on a motion vector of a top subblock of a top coding block and a motion vector of a left subblock of a left coding block. In some embodiments, an indicator is applied to indicate whether motion vectors of the coding block, or the neighboring coding block, or the adjacent subblocks are used to code the reference frames. The indicator is explicitly encoded for the coding block (e.g., 410 and 416 in FIG. 4) of the reference frames in a data stream, and decoded by a video decoder 122 to determine what motion vectors are used to generate motion compensation data at a subblock level for the reference frames. Alternatively, in some embodiments, no indicator is explicitly encoded in a data stream for the coding block of the reference frames. A data stream received at the video decoder 122 implicitly includes such information, and therefore, is analyzed to determine what motion vectors are used to generate motion compensation data at a subblock level for the coding block of the reference frames.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 700) of processing video data. The method 700 is performed by a computing system (e.g., the server system 112) including control circuitry (e.g., the control circuitry 302) and memory (e.g., the memory 314) coupled to the control circuitry. The method 700 includes receiving (702) a current frame including a current coding block, wherein the current coding block has a plurality of subblocks, and wherein the plurality of subblocks are associated with different motion vectors, and include a first subblock located at a boundary of the current coding block. The method 700 further includes (704) determining a motion vector of the current coding block, determining (706) a first motion vector of the first subblock, and generating (708) motion compensation data of the first subblock based on the motion vector of the current coding block and the first motion vector of the first subblock.

(A2) In some embodiments of A1, generating the motion compensation data of the first subblock based on the motion vector of the current coding block and the first motion vector of the first subblock further includes identifying (710) a coding prediction block based on the motion vector of the current coding block, identifying (712) a first prediction block based on the first motion vector of the first subblock, and combining (714) the coding prediction block and the first prediction block to generate the motion compensation data of the first subblock.

(A3) In some embodiments of A2, the method further includes determining a first weight associated with the coding prediction block of the current coding block and determining a second weight associated with the first prediction block based on a distance of each sample of the first subblock and a center of the current coding block. Combining the coding prediction block and the first prediction block further includes averaging the coding prediction block and the first prediction block based on the first weight and the second weight in a weighted manner to generate the motion compensation data of the first subblock.

(A4) In some embodiments of any of A1-A3, the method 700 further includes identifying one or more adjacent subblocks (716) of the first subblock. The method 700 further includes determining (718) an adjacent motion vector for each respective adjacent subblock. The motion compensation data of the first subblock is generated (720) based on the motion vector of the current coding block, the first motion vector of the first subblock, and one or more adjacent motion vectors of the one or more adjacent subblocks.

(A5) In some embodiments of A4, the method further includes determining an third weight for each respective adjacent subblock and identifying a coding prediction block, a first prediction block, and one or more adjacent prediction blocks based on a motion vector of the current coding block, a first motion vector of the first subblock, and the one or more adjacent motion vectors. The method 700 further includes averaging the coding prediction block, the first prediction block, and the one or more adjacent prediction blocks based on a first weight, a second weight, and the third weight of each respective adjacent subblock in a weighted manner to generate the motion compensation data of the first subblock. (A6) Further, in some embodiments of A4 or A5, the method further includes determining the first weight associated with the coding prediction block and determining the second weight associated with the first prediction block based on a distance of each sample of the first subblock and a center of the current coding block. For each sample of the first subblock, the third weight of each respective prediction block is determined based on a distance of the sample of the first subblock from the respective adjacent subblock.

(A7) In some embodiments of any of A4-A6, the first subblock is located at a boundary of the current coding block, e.g., the first subblock in the current coding block and one or two sides of the first subblock 406 overlaps one or two boundaries of the current coding block. The one or more adjacent subblocks include a subset of first adjacent subblocks located in a neighboring coding block (e.g., a top coding block 602, a left coding block 606, a left top coding block 604 in FIG. 6), and the neighboring coding block is immediately adjacent to the current coding block. (A8) In some embodiments of A7, the neighboring coding block is located immediately above the current coding block or immediately to the left of the current coding block.

(A9) In some embodiments of any of A4-A8, the one or more adjacent subblocks includes a subset of second adjacent subblocks that is located jointly with the first subblock in the current coding block, and the subset of second adjacent subblocks include one or more of: a left subblock, a top subblock, a bottom subblock, and a right subblock. Each of the left, top, bottom, and right subblocks is connected to a respective one of left, top, bottom, and right sides of the first subblock, respectively.

(A10) In some embodiments of any of A4-A9, the method further includes identifying the one or more adjacent subblocks based on one or more adjacent subblock identifiers associated with the first subblock.

(A11) In some embodiments of any of A4-A10, the method further includes in accordance with an adjacent subblock selection rule, identifying the one or more adjacent subblocks based on a position of the first subblock in the current coding block.

(A12) In some embodiments of any of A4-A11, each adjacent subblock includes (722) a neighboring subblock that is immediately adjacent to the first subblock.

(A13) In some embodiments of any of A1-A12, a mode data item is applied to define a NEWMV mode. Determining the motion vector of the current coding block further includes identifying the motion vector of the current coding block using the mode data item.

(A14) Alternatively, in some embodiments of any of A1-A12, a mode data item is applied to define a NEAR or NEAREST mode. Determining the motion vector of the current coding block further includes deriving the motion vector of the current coding block using the mode data item.

(A15) In some embodiments of any of A1-A14, determining the first motion vector of the first subblock further includes deriving the first motion vector of the first subblock using a local warped motion mode.

(A16) In some embodiments of any of A1-A15, the method 700 further includes identifying a subblock overlapped block motion compensation (OBMC) indicator associated with the current coding block. In accordance with a determination that a subblock OBMC mode is enabled based on the OBMC indicator, the motion vector of the current coding block and first motion vector of the first subblock are determined to generate the motion compensation data of the first subblock.

(A17) In some embodiments of any of A1-A16, the first motion vector of the first subblock includes a forward coding motion vector corresponding to a forward prediction block and a backward coding motion vector corresponding to a backward prediction block. The method 700 further includes determining a subblock OBMC parameter indicating whether each of the forward backward prediction block and the backward prediction block is applied to predict the plurality of subblocks of the current coding block including the first subblock. In accordance with a determination that the subblock OBMC parameter satisfies a predefined criterion, a first prediction block of the first subblock is determined based on an average of the forward prediction block and the backward prediction block. (A18) Further, in some embodiments of A17, the first subblock is interpolated from the forward prediction block and the backward prediction block. The method 700 further includes determining the forward coding motion vector and the backward coding motion vector based on distances of the first subblock to the forward prediction block and the backward prediction block, respectively.

In another aspect, some embodiments include a computing system (e.g., the server system 112) including control circuitry (e.g., the control circuitry 302) and memory (e.g., the memory 314) coupled to the control circuitry, the memory storing one or more programs configured to be executed by the control circuitry, the one or more programs including instructions for performing any of the methods described herein (e.g., A1-A18 above).

In yet another aspect, some embodiments include a non-transitory computer-readable storage medium storing one or more programs for execution by control circuitry of a computing system, the one or more sets programs including instructions for performing any of the methods described herein (e.g., A1-A18 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a current frame including a current coding block, wherein the current coding block has a plurality of subblocks, and wherein the plurality of subblocks are associated with different subblock-level motion vectors, and include a first subblock located at a boundary of the current coding block;

determining a block-level motion vector of the current coding block;

determining a first subblock-level motion vector of the first subblock; and generating motion compensation data of the first subblock based on the block-level motion vector of the current coding block and the first subblock-level motion vector of the first subblock.

2. The method of claim 1, wherein generating the motion compensation data of the first subblock based on the block-level motion vector of the current coding block and the first subblock-level motion vector of the first subblock further comprises:

identifying a coding prediction block based on the block-level motion vector of the current coding block;

identifying a first prediction block based on the first subblock-level motion vector of the first subblock; and combining the coding prediction block and the first prediction block to generate the motion compensation data of the first subblock.

3. The method of claim 2, further comprising:

determining a first weight associated with the coding prediction block of the current coding block; and determining a second weight associated with the first prediction block based on a distance of each sample in the first subblock and a center of the current coding block;

wherein combining the coding prediction block and the first prediction block further includes averaging the coding prediction block and the first prediction block based on the first weight and the second weight in a weighted manner to generate the motion compensation data of the first subblock.

4. The method of claim 1, further comprising:

identifying one or more adjacent subblocks of the first subblock; and determining an adjacent subblock-level motion vector for each respective adjacent subblock;

wherein the motion compensation data of the first subblock is generated based on the block-level motion vector of the current coding block, the first subblock-level motion vector of the first subblock, and one or more adjacent subblock-level motion vectors of the one or more adjacent subblocks.

5. The method of claim 4, further comprising:

determining a third weight for each respective adjacent subblock; and identifying a coding prediction block, a first prediction block, and one or more adjacent prediction blocks based on the block-level motion vector of the current coding block, the first subblock-level motion vector of the first subblock, and the one or more adjacent subblock-level motion vectors; and averaging the coding prediction block, the first prediction block, and the one or more adjacent prediction blocks based on a first weight, a second weight, and the third weight of each respective adjacent subblock in a weighted manner to generate the motion compensation data of the first subblock.

6. The method of claim 5, further comprising:

determining the first weight associated with the coding prediction block; and determining the second weight associated with the first prediction block based on a distance of each sample in the first subblock and a center of the current coding block;

wherein for each sample of the first subblock, the third weight of each respective prediction block is determined based on a distance of the sample of the first subblock from the respective adjacent subblock.

7. The method of claim 4, wherein the first subblock is located at a boundary of the current coding block, and the one or more adjacent subblocks include a subset of first adjacent subblocks located in a neighboring coding block, and wherein the neighboring coding block is immediately adjacent to the current coding block.

8. The method of claim 7, wherein the neighboring coding block is located immediately above the current coding block or immediately to the left of the current coding block.

9. The method of claim 4, wherein the one or more adjacent subblocks includes a subset of second adjacent subblocks that is located jointly with the first subblock in the current coding block, and the subset of second adjacent subblocks include one or more of: a left subblock, a top subblock, a bottom subblock, and a right subblock, and wherein each of the left, top, bottom, and right subblocks is connected to a respective one of left, top, bottom, and right sides of the first subblock, respectively.

10. The method of claim 4, further comprising:

identifying the one or more adjacent subblocks based on one or more adjacent subblock identifiers associated with the first subblock.

11. The method of claim 4, further comprising:

in accordance with an adjacent subblock selection rule, identifying the one or more adjacent subblocks based on a position of the first subblock in the current coding block.

12. The method of claim 4, wherein each adjacent subblock includes a neighboring subblock that is immediately adjacent to the first subblock.

* * * * *